United States Patent [19]

Iwanaga

[11] Patent Number: 4,996,615
[45] Date of Patent: Feb. 26, 1991

[54] HEAD ASSEMBLY

[75] Inventor: Atsushi Iwanaga, Furukawa, Japan

[73] Assignee: Alps Electric Co., Ltd., Tokyo, Japan

[21] Appl. No.: 239,161

[22] Filed: Aug. 30, 1988

[30] Foreign Application Priority Data

| Dec. 4, 1987 | [JP] | Japan | 62-184317[U] |
| Jan. 9, 1988 | [JP] | Japan | 63-839[U] |
| Jan. 12, 1988 | [JP] | Japan | 63-2273[U] |
| Jan. 14, 1988 | [JP] | Japan | 63-3524[U] |
| Jan. 19, 1988 | [JP] | Japan | 63-4199[U] |
| Jan. 19, 1988 | [JP] | Japan | 63-7642[U] |

[51] Int. Cl.[5] .................. G11B 5/54; G11B 21/21
[52] U.S. Cl. .................................................. 360/104
[58] Field of Search ............................ 360/104, 105

[56] References Cited

U.S. PATENT DOCUMENTS

| 4,327,388 | 4/1982 | Wanek | 360/104 |
| 4,578,726 | 3/1986 | Boehm et al. | 360/99 |
| 4,651,243 | 3/1987 | Daste et al. | 360/104 |

Primary Examiner—Robert S. Tupper
Attorney, Agent, or Firm—Guy W. Shoup; Norman R. Klivans

[57] ABSTRACT

A head assembly suitable for use in a magnetic disk driving apparatus includes an arm bearing a lower head and supported swingingly by a carriage. The arm swings about its own center of gravity, and its base plate portion becomes substantially parallel with a disk during a head-up configuration.

4 Claims, 9 Drawing Sheets

HEAD ASSEMBLY

FIELD OF THE INVENTION

This invention relates to a head assembly used in a disk driving apparatus.

BACKGROUND OF THE INVENTION

Recently, magnetic disk driving apparatuses are widely used as external memory apparatus of word processors, personal computers or other various information devices.

FIG. 22 is a cross-sectional view of a known magnetic head assembly used in a magnetic disk driving apparatus for a disk having two opposite recording surfaces.

In the same drawing, a magnetic head assembly totally designated by reference numeral 101 generally comprises a magnetic head carriage 102 and an arm 103, and is transported by a pulse motor (not shown) in the radial direction of a magnetic disk 105 along a guide shaft 104.

The magnetic head carriage 102 is molded from an insulative synthetic resin, and includes a magnetic head mounting portion 102a as a front extension thereof and a support portion 102 as a rear extension thereof. Reference numeral 107 denotes a lower magnetic head which is attached to the magnetic head mounting portion 102a via a mold case 108. Reference numeral 109 designates a lead wire extending from the lower magnetic head 107 and connected to an externally extending lead wire 111 via a relay terminal 110.

The arm 103 is molded from an insulative synthetic resin into the form of a plate shorter than the magnetic head carriage 102, and a leaf hinge spring 112 is partly embedded integrally in the rear portion of the arm 103. The arm 103 is swingingly mounted to the magnetic head carriage 102 by a screw engagement between the exposed end of the leaf hinge spring 112 and the support portion 102b. Reference numeral 113 refers to a screw which secures the leaf hinge spring 112, 114 to a fixture fitment which fixingly engages the screw 113, to a spacer 115, and to a mounting fitment 116. Reference numeral 117 denotes an upper magnetic head disposed at a position opposed to the lower magnetic head 107 on the magnetic head carriage 102 via a gimbal spring 118. Reference numeral 119 denotes a pivot which engages the back of the gimbal spring 118. Reference numeral 120 refers to a lead wire extending from the upper magnetic head 117 and connected to an externally extending lead wire 122 via a flexible printed board 121. 123 denotes a stress plate interposed between the mounting fitment 116 and the arm 103 to always resiliently bias the arm 103 toward the magnetic head carriage 102 so that the magnetic disk 105 is closely sandwiched between the lower magnetic head 107 and the upper magnetic head 117.

When the magnetic disk 105 is not inserted into the magnetic head assembly 101 having the above-described arrangement, the arm 103 is lifted up by a lift mechanism (not shown) and held at a position rotated in arrow F direction about the swinging center at the junction with the leaf hinge spring 112, so as to hold the upper magnetic head 117 apart from the lower magnetic head 107 by a predetermined distance. When the magnetic disk 105 is inserted and clamped, the lift mechanism (not shown) releases the arm 103 from the lifted position. Responsively, the arm 103 drops with the energy of the stress spring 123, and the magnetic disk 105 is held closely between the lower magnetic head 107 and the upper magnetic head 117 for subsequent information writing or reading.

In order to ensure a stable recording and reproducing characteristic, a stable load pressure is required in the magnetic heads 107 and 117 which closely hold the magnetic disk 105 therebetween.

However, since the arm 103 in the prior art magnetic head assembly 101 is supported by the leaf hinge spring 112 in a cantilever fashion, a moment about the leaf hinge spring 112 is applied to the arm 103 due to an inertia caused by vibration components in the up-and-down direction (in the Z-Z direction of FIG. 22) upon a vibration or impulse against the magnetic head assembly 101, and the load pressure of the magnetic head 107 and 117 against the magnetic disk 105 varies.

Therefore, when the inertia applied to the arm 103 exceeds the load pressure of the magnetic heads 107 and 117 sandwiching the magnetic disk 105, the magnetic heads 107 and 117 fail to maintain reliable contacts with the magnetic disk 105, which apparently prevents a reliable recording or reproduction. Additionally, also the heads 107 and 117 are in acceptable contacts with the magnetic disk 105, any possible change in the load pressure of the magnetic head 107 or 117 against the magnetic disk 105 therebetween causes a variation in the frictional force between the magnetic heads 107-117 and the magnetic disk 105. This invites a vibration of the arm 103 in the rotating direction of the magnetic disk 105 or an uneven rotation of the magnetic disk 105, and these phenomena degrade the recording and reproduction characteristic.

In this connection, the Assignee of the present application, desiring a magnetic head assembly ensuring reliable recording and reproduction regardless of a possible vibration or impulse, formerly proposed a magnetic head assembly which includes an arm carrying a desired functional structure thereon and swingingly supported on a magnetic head carriage, which arm has a support point at a central portion in the length direction thereof to bear the functional part at front end side of the support point and bear a balancer at the rear end side of the support point to balance with the weight at the functional part carrying side.

This proposed magnetic head assembly is shown by a side elevation in FIG. 20 and a fragmentary perspective view in FIG. 21.

In FIG. 20 and 21, the magnetic head assembly 201 generally consists of a carriage 202, a support member 231 fixed to a support portion 202b of the carriage 202 by a screw 230, and an arm 232 swingingly supported by a pivot shaft 243 inserted in insertion holes 234a and 234b formed in the support member 231.

The arm 232, as shown in FIG. 21, is made by bending or folding a rigid metal plate such as aluminum alloy, and includes support points 232a and 232b upstanding at central portions thereof, a mounting portion 232c provided at the front end side of the support points 232a and 232b to engage a magnetic head apparatus 236 and a weight 238 provided at the read end side of the support points 232a and 232b to balance with the weight at the side of the front end side where the magnetic head apparatus is mounted. The mounting portion 232c and the support points 232a and 232b in the formerly proposed embodiment are, as shown in FIG. 20, coplanar with respect to the upper surface of the carriage 202 during loading, and the rear end side beyond the support points 232a and 232b inclines.

Other parts or members in the prior proposal of the Assignee which may be regarded as identical to those in the magnetic head assembly 101 of FIG. 22 are shown by the same reference numerals, and their explanation is omitted here.

In the magnetic head assembly 201 according to the prior proposed embodiment of the Assignee, when the magnetic disk is inserted for loading, the arm 232 pivots in arrow D direction about the pivot axle 243, and the magnetic heads 107 and 117 are separated to permit insertion of the magnetic disk 105 through an opening therebetween. In this case, however, corners 232f defined at the proximal ends of the upstanding support points 232a and 232b advance toward the magnetic disk 105 along an orbit line E. Therefore, when the magnetic disk 105 is in the form of a cartridge in which a magnetic disk is held in a hard case made from a hard synthetic resin, etc., the arm 232 must entirely be located in an upper position so that the corners 232f do not hit the case. However, when the arm 232 is located in an upper position, the thickness of the disk driving apparatus increases and prevents an improvement from the viewpoint of thickness reduction.

Since the prior art proposal of the Assignee supports the arm pivotably and uses the balancer, adverse effects of vibrations or impulses are certainly diminished. However, on the other hand, the structure for supporting the arm is complicated and requires an increased number of parts or members. More specifically, in FIGS. 20 and 21, the swinging support structure of the arm 232 requires the support member 231, the pivot axle 243 and screws and/or washers for fixing them, and further requires the weight 238 and its fixing member.

Beside this, either of the aforegoing prior art assemblies uses other arrangements not shown such as an engaging projection which is attached to the carriage and accepted in a helical feeding groove formed along the outer circumference of a screw shaft, a screw spring attached to the carriage to prevent the engaging projection from dropping out of the feeding groove, and a screw shaft resiliently sandwiched by the engaging projection and the stress spring so as to convert the rotation of the screw shaft into a linear movement of the carriage. However, when the screw shaft stops upon finishing transportation of the carriage, an inertia is applied to the carriage. This inertia causes a resilient deformation at the junction between the engaging projection and the carriage, and the carriage cannot stop immediately when the screw shaft stops. This inevitably elongates the settling time.

OBJECT OF THE INVENTION

It is therefore an object of the invention to provide a head assembly capable of diminishing adverse effects of vibrations or impulses, capable of reducing the thickness and the number of parts or members thereof and capable of diminishing the settling time.

SUMMARY OF THE INVENTION

In order to achieve the aforegoing object, a basic inventive apparatus includes a leaf spring formed integrally with an engaging projection and a stress spring both formed by partly bending the leaf spring; a carriage supportingly engaging the back surface of the leaf spring at the portion of the engaging projection thereof and formed with a pair of substantially parallel upstanding arm mounting pieces provided with first mounting holes; an arm in which a base plate portion thereof including a pair of substantially parallel upstanding mounted pieces provided with second mounting holes for concentrical alignment with the first mounting holes is bent to become substantially parallel to an information recording disk during insertion and ejection of the disk and in which a head unit mounting portion thereof becomes substantially parallel to a guide shaft during loading of the information recording disk; and a pivot shaft inserted in the first mounting holes of the arm mounting member and the second insertion holes of the mounted member to support the arm swingingly, said pivot shaft being configured so that its axis substantially coincides with a straight line which intersects with the length direction of the arm and passes through the center of gravity of the arm.

According to the arrangement, since the arm is supported for swinging motion about its own center of gravity and does not require an interposed support member or balancer used in the prior art assembly, there is little possibility that the arm effects an undesired pivotal movement upon vibrations or impulses, and the number of parts or members can be reduced. Further, since the base plate portion of the arm having the upstanding mounted pieces for insertion of the pivot shaft becomes substantially parallel with the information recording disk in a head-up configuration for insertion or removal of the disk, the arm mounting position may be located close to the carriage. Moreover, since the engaging projection and the stress spring are formed integrally in the form of a single-piece leaf spring, reduction in the number of parts or members is further promoted. Additionally, since the back surface of the leaf spring at the portion of the engaging projection is linearly fixed by a high-rigidity carriage, resilient deformation at the portion of the engaging projection is prevented, and the engaging projection reliably, quickly follows rotating and stopping actions of the screw shaft.

BRIEF DESCRIPTION OF THE DRAWINGS

FIGS. 1 through 19 show an inventive embodiment in which:

FIG. 1 is an exploded view of a magnetic head unit;

FIG. 2 is a perspective view of a magnetic head assembly;

FIG. 3 is a side elevation of same;

FIG. 4 is a back elevation of same;

FIG. 5 is a side elevation of a carriage;

FIG. 6 is a side elevation of same;

FIG. 7 is a plan view of an arm;

FIG. 8 is a back elevation of same;

FIG. 9 is a side elevation of same;

FIG. 10 is a plan view of a magnetic head unit;

FIG. 11 shows how a shield plate and a magnetic head are assembled;

FIG. 12 shows how a follower engages a screw shaft;

FIG. 13 is a front elevation of the follower;

FIG. 14 shows a stress spring portion of the follower as seen from arrow M direction of FIG. 13;

FIG. 15 is bottom view of the follower;

FIG. 16 is an exploded front elevation of a pivot shaft;

FIG. 17 is a fragmentary bottom view of a magnetic head unit mounted to a carriage;

FIG. 18 is a fragmentary cross-sectional view of same;

FIG. 19 show the positional relationship between the arm and other members;

FIGS. 20 through 22 show prior arts in which;

FIG. 20 is a side elevation of a prior art magnetic head assembly;

FIG. 21 is a fragmentary perspective view of same; and

FIG. 22 is a side elevation of another prior art magnetic head assembly.

DETAILED DESCRIPTION

Figure 1:
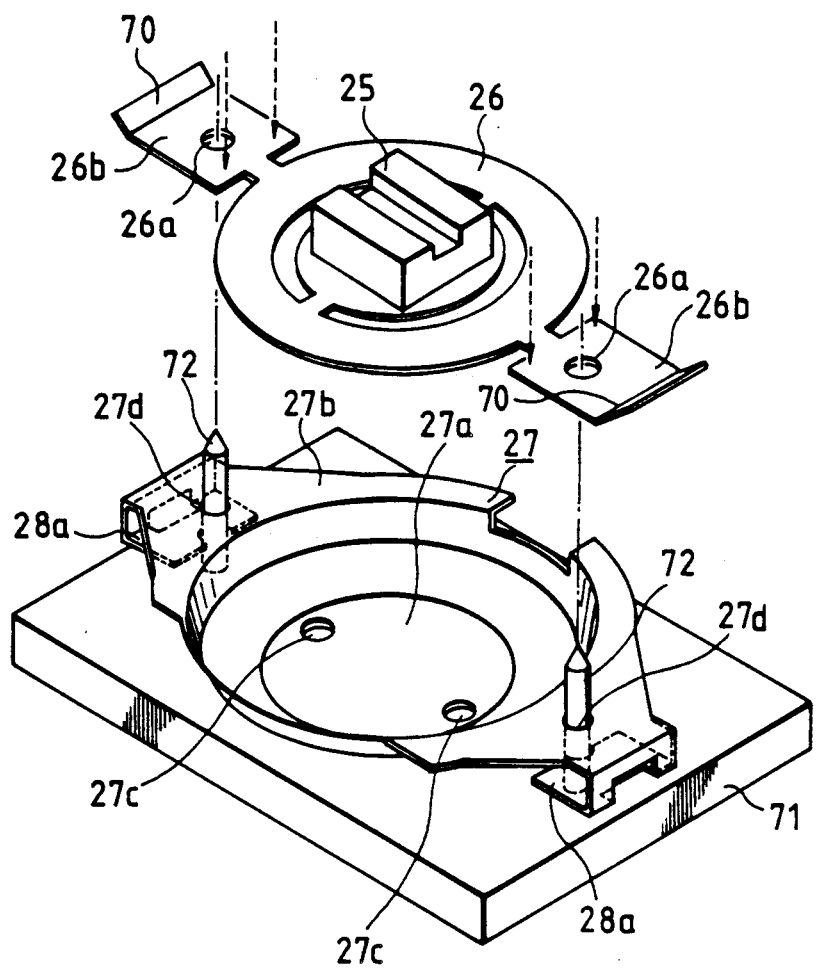

The invention is described below in detail, referring to a preferred embodiment illustrated in the drawings.

Figure 2:
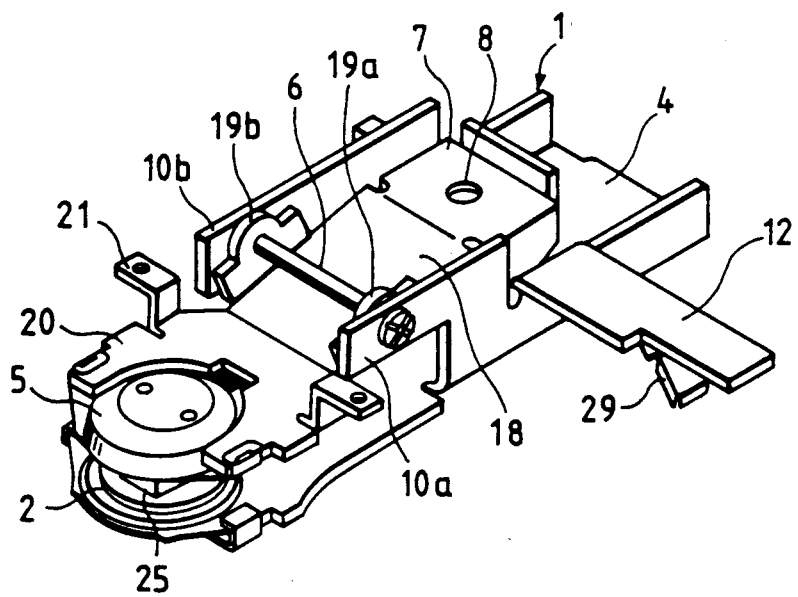
Figure 3:
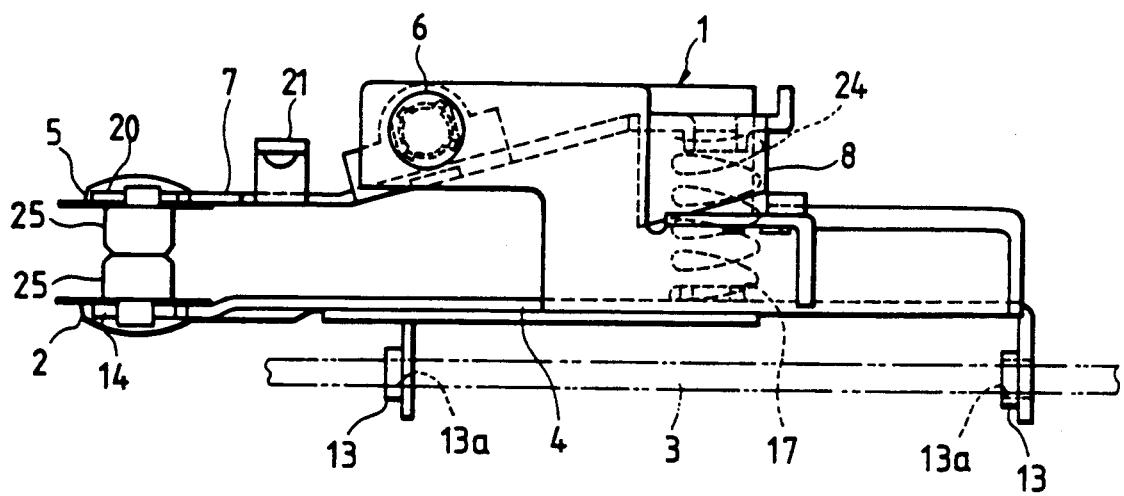
Figure 4:
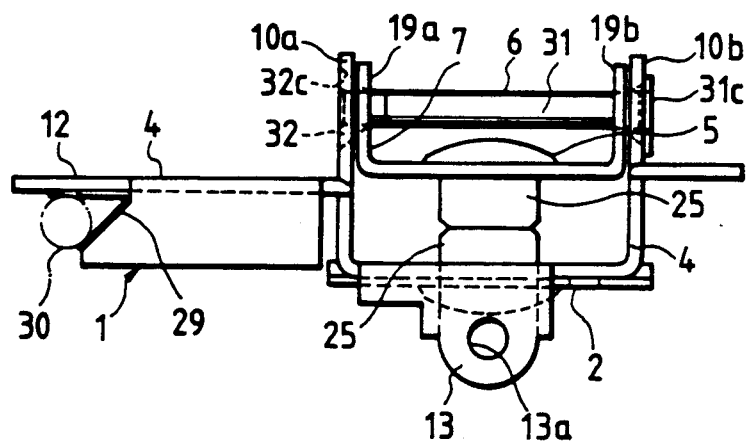
Figure 5:
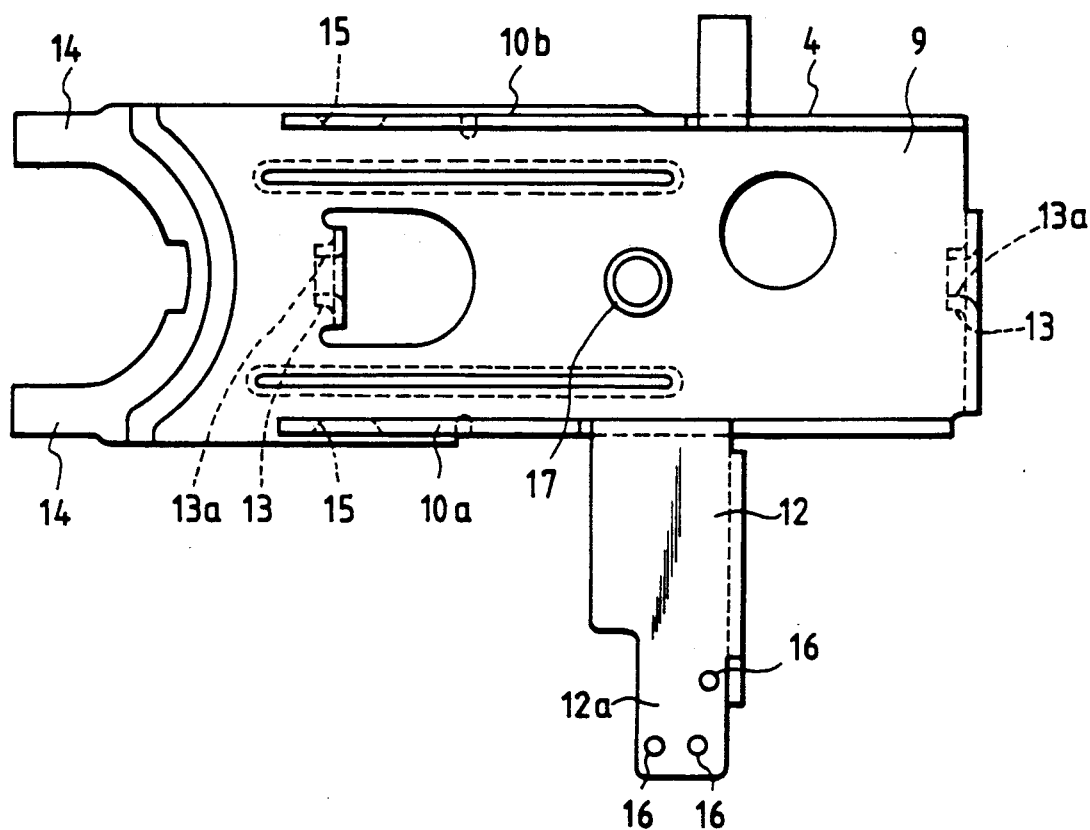
Figure 6:
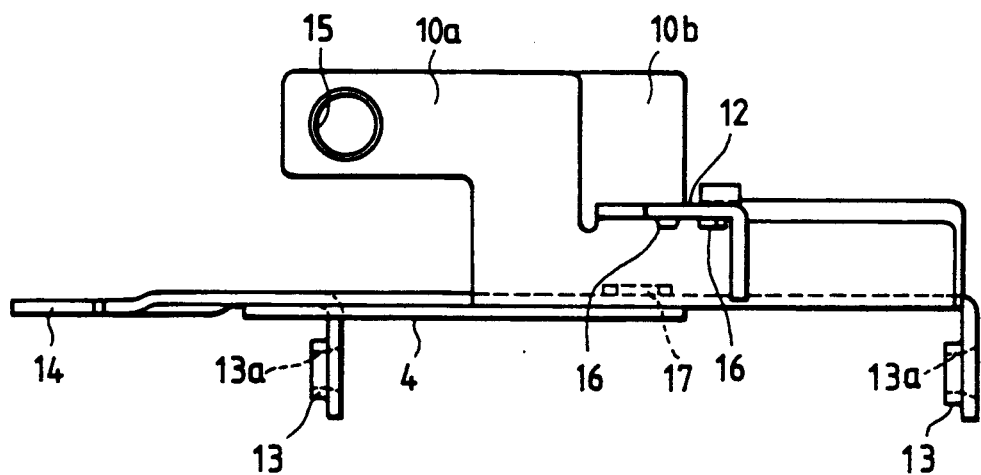
Figure 7:
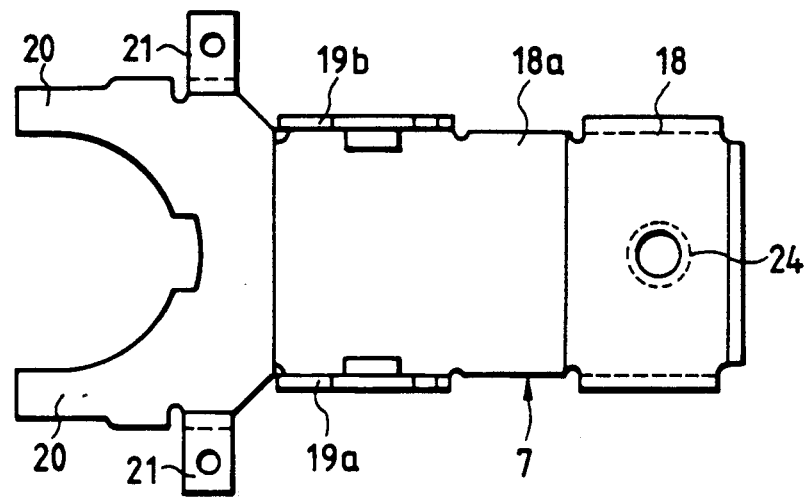
Figure 8:
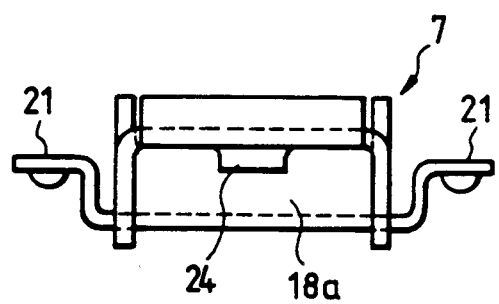
Figure 9:
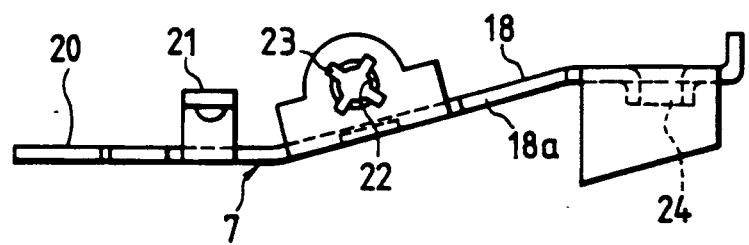
Figure 10:
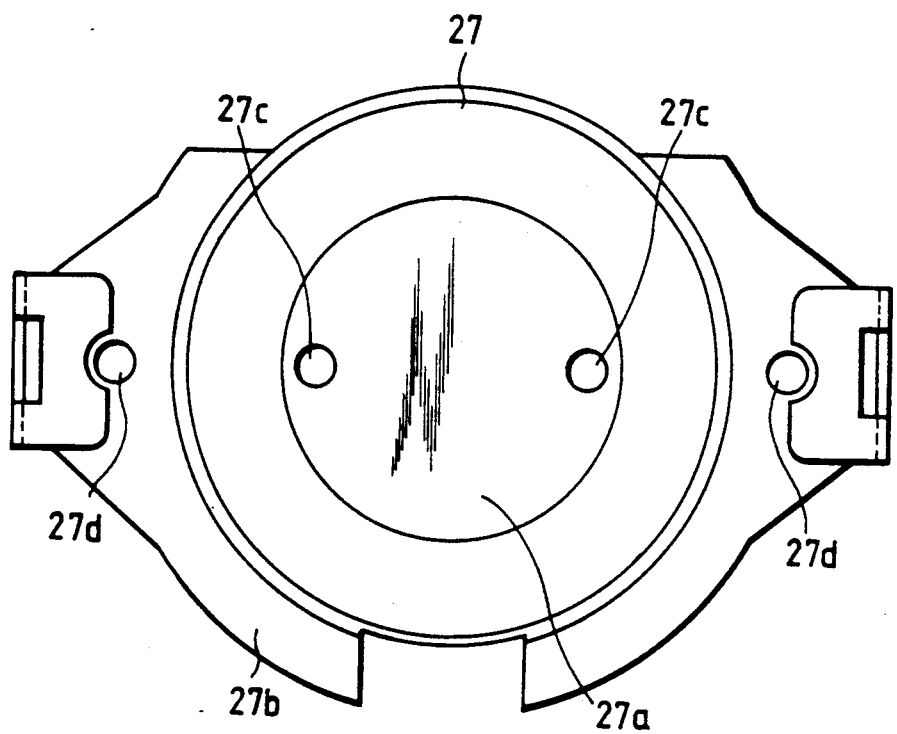
Figure 11:
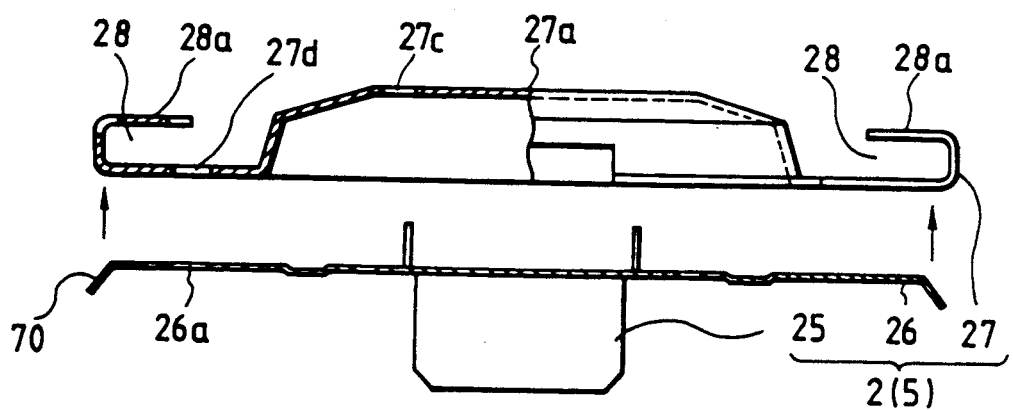
Figure 12:
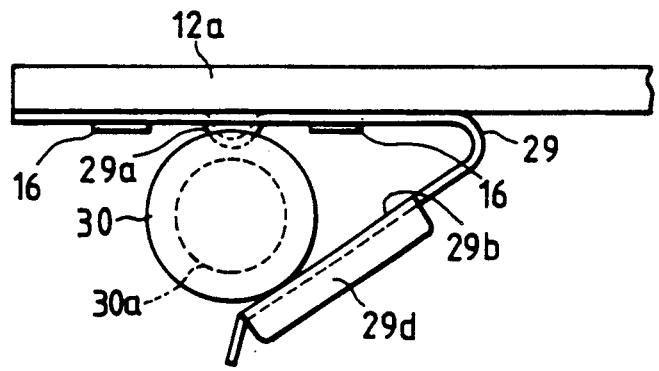
Figure 13:
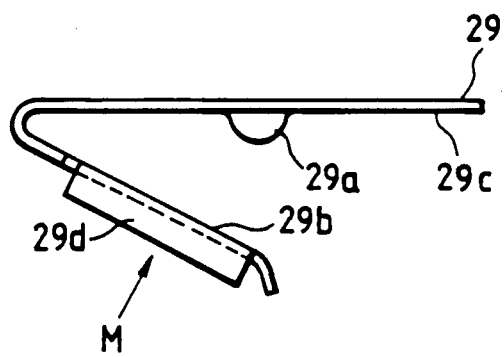
Figure 14:
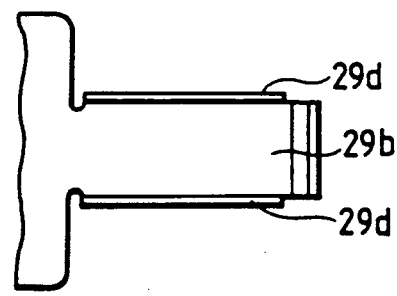
Figure 15:
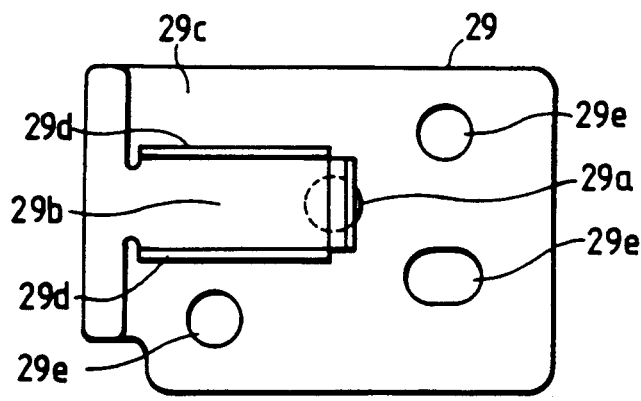
Figure 16:
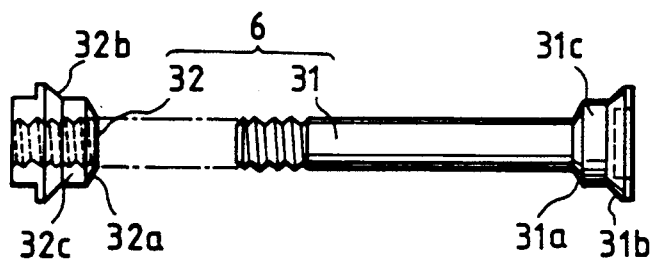
Figure 17:
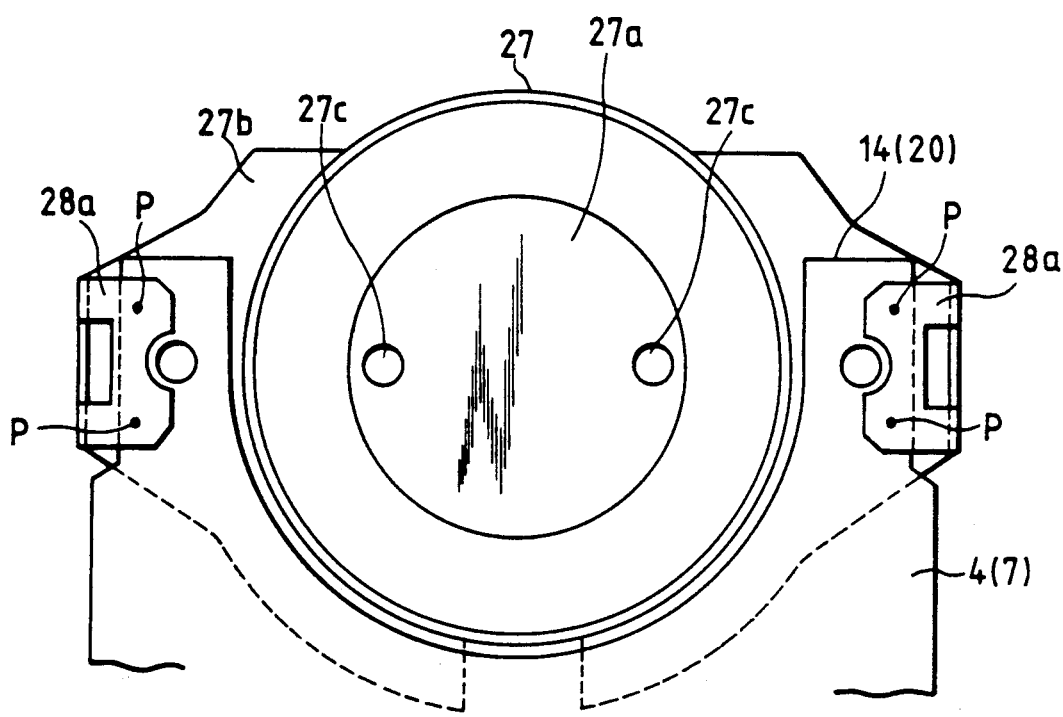
Figure 18:
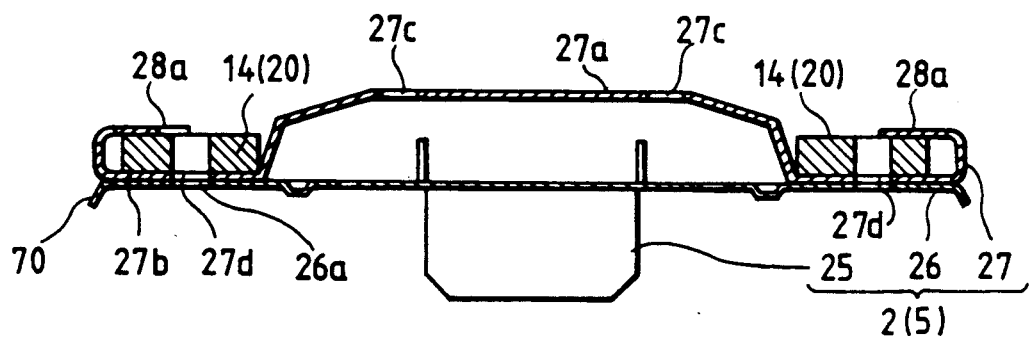
Figure 19:
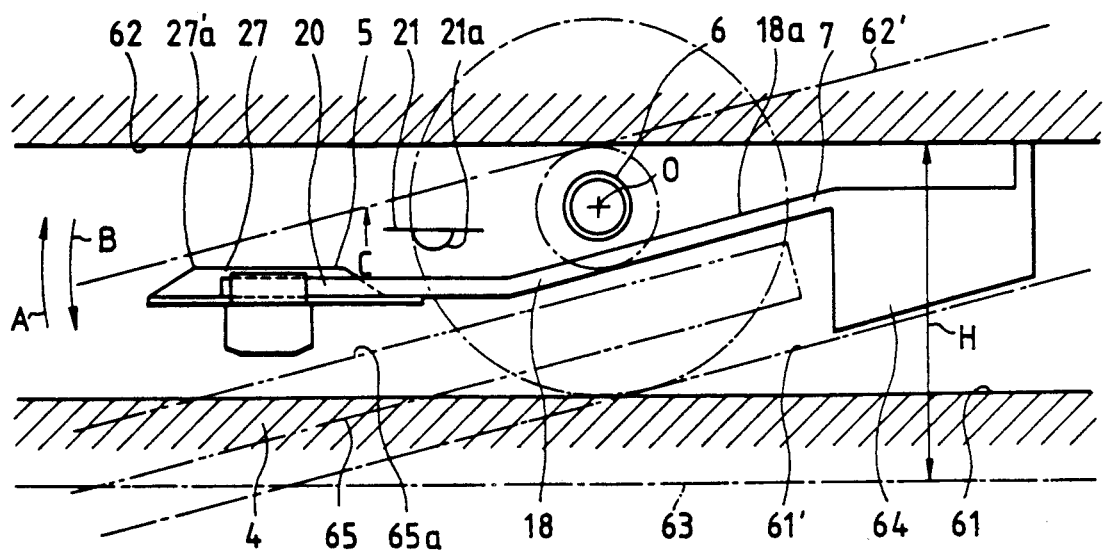
Figure 20:
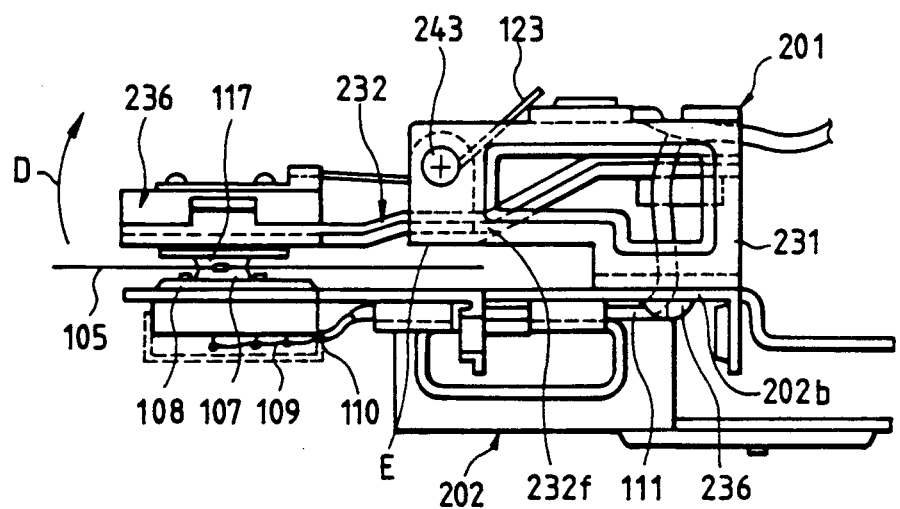
Figure 21:
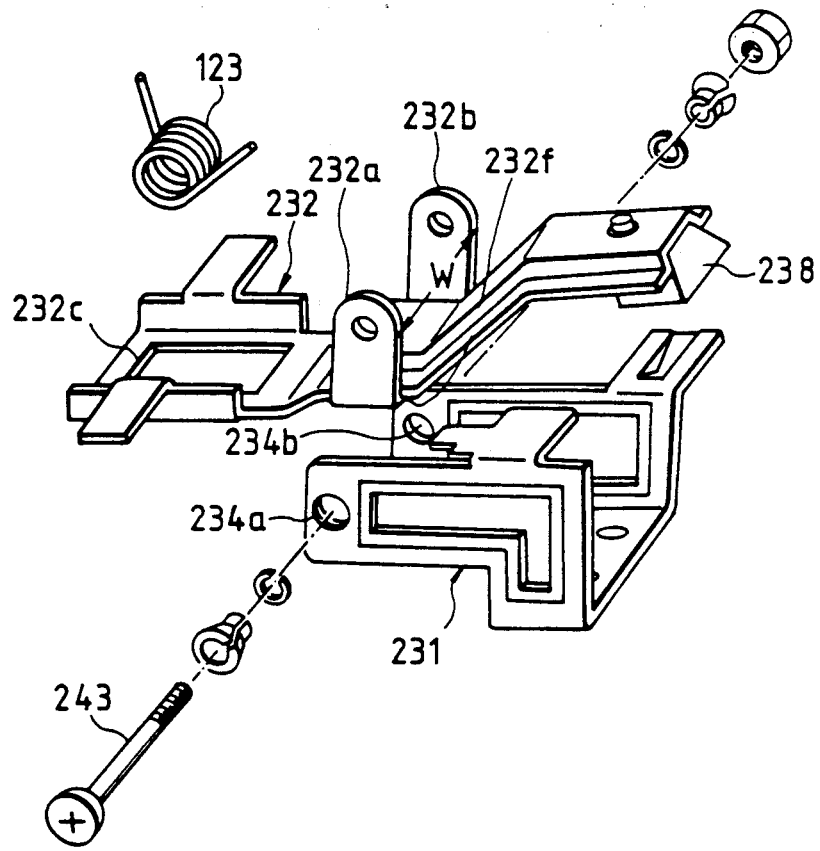
Figure 22:
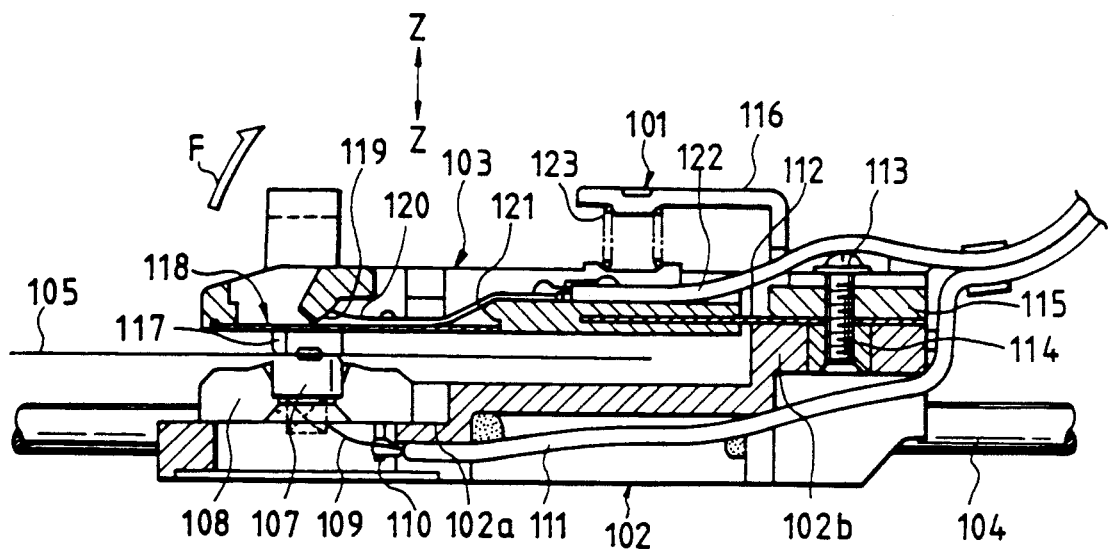

FIGS. 1 through 19 show an arrangement of an inventive embodiment in which FIG. 1 is an exploded view of a magnetic head unit; FIG. 2 is a perspective view of a magnetic head assembly; FIG. 3 is a side elevation of same; FIG. 4 is a back elevation of same; FIG. 5 is a plan view of a carriage; FIG. 6 is a side elevation of same; FIG. 7 is a plan view of an arm; FIG. 8 is a back elevation of same; FIG. 9 is a side elevation of same; FIG. 10 is a plan view of a magnetic head unit; FIG. 11 shows how a shield plate and a magnetic head are assembled; FIG. 12 shows how a follower engages a screw shaft; FIG. 13 is a front elevation of the follower; FIG. 14 shows a stress spring portion of the follower as seen from arrow M direction of FIG. 13; FIG. 15 is a bottom view of the follower; FIG. 16 is an exploded front elevation of a prior shaft; FIG. 17 is a fragmentary bottom view of a magnetic head unit mounted to a carriage; FIG. 18 is a fragmentary cross-sectional view of same; and FIG. 19 shows the positional relationship between the arm and other members.

Referring to FIGS. 2 through 4, a magnetic head assembly 1 generally consists of a carriage 4 bearing a lower magnetic head unit 2 and linearly transported in the radial direction of a magnetic disk along a guide shaft 3; an arm 7 also called a hold case bearing an upper magnetic head unit 5 and supported by a pivot shaft 6 swingingly with respect to the carriage 4; and a coil spring interposed between a rear end of the arm 7 and the carriage 4 to bias both magnetic head units 2 and 5 in a relative approaching direction.

The carriage 4, as best shown in FIGS. 5 and 6, includes a base plate 9, a pair of arm mounting plates 10a and 10b upstanding from opposite margins of the base plate 9, a follower mounting plate 12 for mounting thereto a follower which will be described later, and a guide shaft inserting portion 13 for accepting the guide shaft 3 therethrough, which all are integral parts made by bending or folding a singlepiece aluminum alloy flat plate.

At the left end of the base plate 9 in the drawings are formed a bifurcated pair of parallel mounting extensions 14 for mounting the lower magnetic head unit 2. The arm mounting plates 10a and 10b are resilient, substantially parallel in a slightly opening fashion, and formed with mounting holes 15 for accepting the pivot shaft 6 therein across the length direction of the base plate 9. The mounting holes 15 are beveled therearound in the form of a dish so that angled surfaces 31b and 32b of engaging portions 31c and 32c of the similarly beveled shaft 6, which will be described later in a greater detail, engage the dish-like mounting holes 15 so as to resiliently deform both arm mounting plates 10a and 10b in the relative approaching direction and permit relative swinging movements between the angled surfaces 31b-32b and the mounting holes 15.

The follower mounting plate 12 extends outwardly in parallel with the base plate 9 from the arm mounting plate 10a located under the base plate 9 in FIG. 5, and three projections 16 extend downwardly in FIG. 6 at a follower mounting portion 12a at the outer end thereof.

The guide shaft inserting portion 13 is a plate piece cut and bent downwardly along the center line in the length direction of the base plate 9, and has a shaft inserting hole 13a at the center thereof for accepting the guide shaft 3 therein to regulate the moving direction of the carriage 4. Further, a projection 17 is formed on the upper surface of the base plate 9 to regulate the lower position of the coil spring 8.

The arm 7, as best shown in FIGS. 7 through 9, includes a base plate 18 having an angled surface 18a at a central portion thereof, a pair of mounted plates 19a and 19b upstanding from opposite margins of the angled surface 18a so as to be mounted to the carriage 4, mounting extensions 20 for mounting the magnetic head unit 5 thereon, and projecting pieces 21 for opening and closing the arm 7, which all are formed in a unitary body by selectively bending or folding an aluminum alloy flat plate as same as the carriage 4.

The mounted plates 19a and 19b are substantially parallel in a slightly opening fashion, and have formed mounting holes 22 smaller in diameter than the mounting holes 15 of the arm mounting plates 10a-10b. The mounting holes 22 have cross-shaped slits, and inner surfaces of the mounting holes are beveled in a dish-like configuration. The distance between the mounted plates 19a-19b, i.e. the width of the angled surface 18a of the base plate 18 is smaller than the inner dimension of the arm mounting plates 10a-10b of the carriage 4 so that outer surfaces of the mounted plates 19a-19b can be put in confrontation with inner surfaces of the arm mounting plates 10a-10b.

The mounting extensions 20 at the left end of the base plate 18 in FIGS. 7 and 9 for mounting the upper magnetic head unit 5 thereto have the same configuration as the lower magnetic head unit mounting extensions 14 of the carriage 4, and both are arranged to be assembled with the units by inserting the units from the opened end of the mounting extensions 20. Further, a projection 24 extends vertically from the lower surface of the base plate 18 at the opposite sides to the upper magnetic head unit mounting extensions, i.e. at the right end in FIGS. 7 and 9, and is opposed to the projection 17 to regulate the arm-side position of the coil spring 8.

The upper magnetic head unit 5, as best shown in FIG. 1, includes a magnetic head 25 in the form of a head slider including a read/write core provide with read/write gaps; the magnetic head 25 being adhesively secured to a central spring plate portion of a stainless steel gimbal spring 26 having a substantially round outer configuration; and a permalloy shield plate 27 having a cup-shaped containing portion 27a, a flange portion 27b and a hole 27d which accepts a positioning pin 72 of a fixture tool 71, said gimbal spring having a flange portion 26b formed with an insertion hole 26a for accepting the positioning pin 72 to fix relative positional relationship among these members.

As shown by a dotted line in FIG. 1, by securing the outer ring portion of the gimbal spring 26 to the flange portion 27b by laser beam welding, the magnetic head 25, gimbal spring 26 and shield plate 27 are conjoined into the unitarily fixed upper magnetic head unit 5 as shown in FIGS. 10 and 11.

The shield plate 27 is a one-piece resilient member and includes a containing portion 27a having a hole 27c in the upper surface thereof in FIG. 17 for positioning the shield plate 27 relative to the mounting portion 20 and includes a flange portion 27b having a positioning hole 27d for positioning the shield plate 27 relative to the gimbal spring 26. Correspondingly, the flange portion 26b of the gimbal spring 26 is also provided with the above-mentioned positioning hole 26a having the same diameter. The flange portion 26b is further provided with a holding piece 70 made by partly bending or folding the flange portion itself so that the holding piece 70 is pinched by pincettes when assembling the shield plate 27.

Further, the shield plate 27 has folded pieces 28a made by folding selected symmetrical parts of the flange portions 27b by 180 degrees, and a mounting groove 28 is formed between opposed surfaces of the folded pieces 28a and the flange portion 27b to be inserted into the mounting portion 20. The lower magnetic head unit 2 is also formed in the same manner.

The follower 29 mounted to the follower mounting portion 12a of the follower mounting plate 12 is configured, as shown in FIG. 12, to engage the helical feeding groove 30a along the outer circumference of the screw shaft 30 to convert rotations of the screw shaft 30 into linear movements of the carriage 4, and is made by bending or folding a single-piece spring-use stainless steel plate into a unitary body including a projection 29a for engaging the feeding groove 30a and a stress spring 29b for resiliently sandwiching the screw shaft 30 between the projection 29a and itself to prevent the projection 29a from dropping out of the feeding groove 30a.

The stress spring portion 29b of the follower 29, as shown in FIGS. 13 through 15, is folded in the form of letter V so that the base portion 29c including the projection 29a is opposed to the folded-back portion, and cut and bent pieces are formed along opposite margins to ensure a rigidity, exhibiting a narrow configuration. The base portion 29c is provided with mounting and positioning holes 29e at positions corresponding to the projections 16 of the follower mounting portion 12a to engage the projections 16.

The follower 29 is mounted to the carriage 4 by putting the holes 29e on the projections 16 and crushing or deforming the projections 16 projecting from the base portion 29c. Other mounting methods such as laser beam welding and spot welding may be employed for this conjunction. However, since the carriage 4 and the follower 29 are made from aluminum alloy and stainless steel respectively, such crushing or deformation is simple and effective.

The pivot shaft 6, as shown in FIG. 16, consists of bolt 31 and nut 32 having different configurations. These bolt and nut 31-32 include large-diameter contact portions 31c-32c having two-step angled surfaces 31a-31b and 32a-32b, and among these, inner smaller-diameter angled surfaces 31a and 32a fit the beveled portions of the mounting holes 22 of the mounted plates 19a-19b of the arm 7 whereas the outer larger-diameter angled surfaces 31b-32b fit the beveled portions of the mounting holes 15 of the arm mounting plates 10a-10b.

The magnetic head assembly 1 having the abovedescribed arrangement is assembled as explained below.

First of all, the arm 7 is positioned between both arm mounting plates 10a-10b of the carriage 4 so as to oppose the mounted plates 19a-19b of the arm 7 to the arm mounting plates 10a-10b and align both mounting holes 10 and 22 concentrically. Subsequently, the bolt 31 forming the pivot shaft 6 is inserted into the mounting holes 15 and 22, and a nut 32 is applied from the other side and screwed up by a predetermined torque, inserting, for example, a gage between both mounted plates 19a-19b to regulate the distance therebetween. In this fashion, the arm mounting plates 10a-10b and the mounted plates 19a-19b are resiliently deformed toward the relatively approaching direction, and a bias is applied respectively between the arm mounting plates 10a-10b and the mounted plates 19a-19b so as to conjoin at least three members without play.

In the shaft conjunction in the embodiment, sizes and fastening torques are settled among these three members so that the fastening establishes a strong engagement between the mounting holes 22 of the mounted plates 19a-19b and the angled surfaces 31a-32a to ensure integral movements of the arm 7 and the pivot shaft 6 and so that a slidable bias is applied between the arm mounting holes 15 of the mounting plates 10a-10b and the angled surfaces 31b-32b. Accordingly, the arm 7 is supported swingingly relative to the carriage 4. In this case, in order to ensure slidable movements between the mounting holes 15 and the angled surfaces 31b-32b, grease, etc. may be used. The groove 23 is provided to serve as a relief groove. The mounting holes 15 may also be provided with similar grooves to serve as groove reservoirs. An adhesive is preferably applied to the junction between the bolt 31 and nut 32 fastened together at a predetermined fastening torque to maintain the fastened condition.

Subsequently, to the follower mounting portion 12a of the carriage 4 in the above-mentioned shaft connection is mounted the follower 29 by caulking or deformation, and the moving direction converting device for the magnetic head assembly 1 is incorporated. The mounting of the follower 29 may be effected before the shaft coupling process.

Subsequently, the magnetic head unit is mounted. This is performed by first mounting to the carriage 4 the lower magnetic head unit 2 which already integrally incorporates the lower magnetic head 25, gimbal spring 26 and shield plate 27 as described above.

More specifically, holding the magnetic head 25 of the lower magnetic head unit 2 facing toward the arm 7, the mounting groove 28 is inserted into the mounting portion 14 from a left-hand side of FIGS. 5 and 6, and the magnetic head unit 2 is positionally fixed with respect to the carriage 4 using an optical means. After this, as shown in FIG. 17, every two points shown at P are welded by laser beam welding from the front surface side of the folded pieces 28a. Additionally, every two points are adhered by laser beam welding also from the sides of the flange portions 27b opposed to the folded pieces 28a to reliably mount the lower magnetic head unit 2 to the mounting portion 14. The assembled configuration is shown in FIG. 18. Since this assemblage is performed in a non-contacting condition, the mounting accuracy is improved, and parts or members can be small-scaled to reduce the entire dimension of the apparatus significantly.

On the other hand, after the lower magnetic head unit 2 is mounted, the upper magnetic head 25 unit 5 integrally incorporating the upper magnetic head 25, gimbal spring 26 and shield plate 27 is mounted to the mounting portion 20 of the arm 7 in the same manner. In this case, since the gap of the upper magnetic head 25 must be mounted accurately in a 4-track or 8-track different positions from the gap of the lower magnetic head 25 according to the standard, positions of the gap of the lower magnetic head 25 and the gap of the upper magnetic head 25 are confirmed optically, and after the upper magnetic head unit 5 is adjusted through a rod inserted in the hole 27c if necessary, laser beam welding is applied upon completion of the adjustment. This adjustment may be effected by rotating a positional adjustment disk and picking up an output from the upper magnetic head 25 in lieu of the optical method. That is, any appropriate method may be selected according to the employed process.

After the follower 29, lower and upper magnetic head units 2 and 5 are mounted, the coil spring 8 for applying a load pressure is interposed between the projections 17 and 24 of the carriage 4 and the arm 7. In this fashion, the sheet-metal magnetic head assembly 1 is obtained which is supported swingingly by the pivot shaft 6 and in which the inter-gap distance is adjusted when the magnetic head units 2 and 5 are mounted to the carriage 4 and the arm 7.

In the aforegoing embodiment, the contact portions 31c and 32c of the pivot shaft 6 are in a rigid engagement with the mounted plates 19a and 19b of the arm 7 slidably with respect to the mounting plates 10a and 10b of the carriage 4. However, the opposite relationship may be employed.

Further, the aforegoing embodiment is described as using laser beam welding for integral conjunction of the upper and lower magnetic head units and for fixture of the carriage of each magnetic head to the arm. However, the invention is not limited to this, and any other fixing method such as electron beam welding may be employed. When the carriage 4 and the arm 7 are made from aluminum alloy as described above, the weight of the carriage assembly is reduced, which contributes to a lower power consumption, and it is possible to remove the energizing voltage for the stepping motor, which contributes to a reduction in the settling time Furthermore, the carriage 4 and the arm 7 are each made by lending or folding a single-piece plate in the aforegoing embodiment. However, the arm mounting plates 10a-10b and the mounted plates 19a-19b may be formed by molding into a synthetic resin plate appropriately selected as the major body of the carriage 4 or the arm 7 according to the selected design. Additionally, since the holding piece 70 formed by partly bending or folding the flange portion 26b of the gimbal spring 26 is provided so as to be pinched by pincers, etc. upon coupling the gimbal spring to the shield plate 27, the magnetic head unit can be assembled very simply and easily.

The arm 7 of the magnetic head assembly 1 having the above-described arrangement is movable swingingly in the range explained below, referring to FIG. 19.

In FIG. 19, the arm 7 swings in arrow A and B directions about the center 0 of the pivot shaft 6. Above the arm 7 is positioned the lower surface 62 of a case of the disk driving apparatus, and below the arm 7 is positioned the carriage 4. In FIG. 19, the upper surface of the carriage 4 is designated by reference numeral 61, and the axial line of the guide shaft 3 regarded as a reference is designated by 63. FIG. 19 shows the loaded condition of the arm 7, from which condition the projection 21a of the projecting piece 21 also called a load arm is pushed up in arrow C direction, so that the arm 7 rotates about the center 0 so as to bring the magnetic head unit 5 up to a position just before the stopper 64 downwardly extending from the other end of the arm remote from the magnetic head unit engages the upper surface 61 of the carriage 4. The relative position of the upper surface of the carriage 4 in this configuration is denoted by 61'. That is, due to a pivotal movement of the arm 7 in arrow A direction, the arm 7 and the carriage 4 become relatively identical to the configuration in which the upper surface of the carriage 4 is located in the position shown by 61'. In this case, the angled surface 18a of the base plate portion 18 of the arm 7 is substantially parallel with the upper surface 61', the margin 27a' of the containing portion 27a of the shield plate 27 of the magnetic head unit 5 is located at a position just before engagement with the lower surface 62' of the case.

Therefore, when the disk cartridge 65 is inserted, it becomes parallel with the base plate portion 18, and the mounting position of the arm 7 with respect to the carriage 4 can be approached to the carriage 4 up to the minimum distance where the arm does not hit or engage the disk cartridge 65.

When the pushing force of the projection 21a is removed from the aforegoing condition to return the head unit bearing end of the arm 7 in arrow B direction, the magnetic head 25 enters into the case of the disk cartridge 65 through a head insertion aperture (not shown) of the disk cartridge 65 and slidably contacts the magnetic disk to effect recording or reproduction. At this time, since the mounting portion 20 for the arm 7 for mounting the magnetic head unit 5 is parallel with the upper surface 65a of the disk cartridge 65, upper surface 61 of the carriage 4 and the axial line 63 of the guide shaft 3, respectively, the mounting portion 20 never hits or engages the upper surface 65a of the disk cartridge 65. Under this arrangement, the height H from the axial line 63 of the guide shaft 3 taken as a reference of the height of the magnetic disk driving apparatus can be minimized.

Further, since the aforegoing embodiment selects the upstanding positions of the mounted plates 19a 19b considering the center of gravity of the arm 7, and the axial center 0 of the pivot shaft 6 is set so as to pass the center of gravity of the arm 7, i.e., so as to make the arm 7 swing about its own center of gravity at the support axle position where the moment at the side of the head apparatus bearing end equals the moment of the other end of the arm 7, the arm 7 seldom pivots undesirably upon vibrations or impulses, and it is possible to significantly restrain changes in the load pressure of the magnetic head 25 or changes in the frictional force between the magnetic disk and the magnetic head 25. As a result, always reliable recording and reproduction are established, and it is not necessary to interpose a support member or use a balancer as in the prior art apparatus using an arm of a pivot-support arrangement. Apparently, this advantage contributes to a significant reduction in the number of parts or members.

Further, since the aforegoing embodiment is configured to fix the back surface of the base portion 29c of the follower 29 directly to the highly-rigid carriage 4 by caulking or deformation, the base portion 29c of the follower 29 is never deformed resiliently upon completion of transport of the carriage 4 and subsequent stop motion of the screw shaft 30, which improves the response of the follower 29 to the rotation-stopping motion of the screw shaft 30. Therefore, under the aid of the aforementioned weight reduction, the settling time is further reduced.

As described above, according to the invention in which the arm is supported swingingly about its own center of gravity, in which the base plate portion of the arm becomes substantially parallel with an information recording disk during a head-up configuration, and in which the back surface of the leaf spring also functioning as a stress spring is secured at the portion of the engaging projection thereof to the carriage, always reliable recording or reproduction is established even upon vibrations or impulses, the thickness is readily reduced, the number of parts or members is significantly reduced, and the settling time is shortened, which all are excellent effects of the inventive head assembly.

What is claimed is:

1. A head assembly including a carriage bearing a lower head unit and an arm bearing an upper head unit, said carriage being transported along a guide shaft in a radial direction on a surface of a recording disk, comprising an improvement wherein:

said arm includes a pivot shaft position located at a center of gravity of said arm including said upper head unit, and said arm is supported directly on said carriage at the pivot shaft position;

wherein said arm has no attached balance weight and is not supported by a spring; and wherein said shield plate defines in an upper surface thereof a positioned hole for adjusting the position of the magnetic head.

2. A head assembly according to claim 1 wherein said upper head unit includes a magnetic head, a spring plate resiliently supporting the magnetic head, and a shield plate supporting the spring plate.

3. A head assembly according to claim 2 wherein said spring plate includes a flange portion which serves as a mounting portion for said shield plate, said flange portion including a holding piece formed by bending the flange portion.

4. A head assembly including a carriage bearing a lower head unit and an arm bearing an upper head unit which is supported swingingly with respect to the carriage so that said carriage is transported along a guide shaft in a radial direction of a surface of a recording disk, an improvement wherein said arm is supported swingingly with respect to said carriage at a pivot shaft position which is a center of gravity of said arm including said upper head unit; and wherein said upper head unit is a unitary body including a magnetic head, a spring plate resiliently supporting the magnetic head and a shield plate supporting the spring plate; and wherein said shield plate defines in an upper surface thereof a positioning hole for adjusting the position of the magnetic head.

* * * * *